United States Patent
Coen et al.

(10) Patent No.: US 9,027,738 B2
(45) Date of Patent: May 12, 2015

(54) ARRANGEMENT OF TRANSFER MODULES

(75) Inventors: Daniele Coen, Albinea (IT); Andrea Andreoli, Modena (IT)

(73) Assignee: Rexnord Flattop Europe S.R.L., Coreggio (IT)

( * ) Notice: Subject to any disclaimer, the term of this patent is extended or adjusted under 35 U.S.C. 154(b) by 29 days.

(21) Appl. No.: 14/111,112

(22) PCT Filed: Apr. 16, 2012

(86) PCT No.: PCT/EP2012/056941
§ 371 (c)(1),
(2), (4) Date: Dec. 17, 2013

(87) PCT Pub. No.: WO2012/140269
PCT Pub. Date: Oct. 18, 2012

(65) Prior Publication Data
US 2014/0110223 A1    Apr. 24, 2014

(30) Foreign Application Priority Data
Apr. 14, 2011    (IT) ............... MI2011A0642

(51) Int. Cl.
| | |
|---|---|
| *B65G 47/66* | (2006.01) |
| *B65G 37/00* | (2006.01) |
| *B65G 17/08* | (2006.01) |
| *B65G 23/06* | (2006.01) |

(52) U.S. Cl.
CPC ............... *B65G 37/00* (2013.01); *B65G 17/08* (2013.01); *B65G 23/06* (2013.01); *B65G 47/66* (2013.01); *B65G 2207/30* (2013.01)

(58) Field of Classification Search
USPC .................... 198/539, 599, 600, 605
See application file for complete search history.

(56) References Cited

U.S. PATENT DOCUMENTS

| | | | | |
|---|---|---|---|---|
| 2,624,444 | A * | 1/1953 | Casabona ............... | 198/560 |
| 5,215,182 | A * | 6/1993 | Garbagnati ............ | 198/635 |
| 6,164,435 | A * | 12/2000 | Coen et al. ........... | 198/600 |
| 6,978,875 | B2 * | 12/2005 | Diaz ..................... | 198/325 |
| 7,210,569 | B1 | 5/2007 | Tarhan et al. | |
| 7,676,732 | B2 * | 3/2010 | Moon et al. .......... | 714/774 |
| 8,157,083 | B2 * | 4/2012 | Bogle ................... | 198/599 |
| 8,210,341 | B2 * | 7/2012 | Marshall et al. ..... | 198/600 |
| 8,365,899 | B2 * | 2/2013 | McKee .................. | 198/539 |
| 8,567,591 | B2 * | 10/2013 | GonzaLez Alemany et al. ................... | 198/600 |
| 2010/0230247 | A1 | 9/2010 | McKee | |

FOREIGN PATENT DOCUMENTS

EP    0919493 A1    6/1999

OTHER PUBLICATIONS

PCT International Search Report, Application No. PCT/EP2012/056941, Jun. 1, 2012, 2 pages.

* cited by examiner

*Primary Examiner* — Douglas Hess
(74) *Attorney, Agent, or Firm* — Quarles & Brady LLP

(57) ABSTRACT

A transfer modules arrangement (100) for an articles conveyor (110). The transfer modules arrangement includes at least one transfer module (125) in turn comprising a frame (310) housing a plurality of idle rollers (135) for allowing an inertial run of transported articles (140) between consecutive conveyor belt/chain elements (115*a*, 115*b*) of the articles conveyor. According to the invention, the transfer modules arrangement includes at least one positioning rod (120). Additionally, the frame of the at least one transfer module further includes a shaped cavity (315) for allowing a sliding insertion of the at least one transfer module on the at least one positioning rod.

11 Claims, 5 Drawing Sheets

ARRANGEMENT OF TRANSFER MODULES

CROSS-REFERENCE TO RELATED APPLICATIONS

This application represents the national stage entry of PCT International Application No. PCT/EP2012/056941 filed on Apr. 16, 2012, which claims priority to Italian Patent Application No. MI2011000642 filed on Apr. 14, 2011, both of which are hereby incorporated by reference in their entirety and for all purposes.

The present invention relates to components for conveyors, and in particular to a transfer module for conveyors of articles.

Transfer modules are used in conveyors of articles, for example in belt or chain conveyors, to allow the transfer of the transported articles from a first to a second consecutive belt or chain conveyor elements (hereinafter, purely for simplicity, only the case of a belt conveyor element will be considered). In particular, a belt of a conveyor of articles has a maximum length defined primarily by the intrinsic characteristics of the belt. A first intrinsic characteristic is the power (i.e. the torque) of an actuating motor that drives the sliding of the belt so as to transport the articles. A second intrinsic characteristic is given by the deformability of the belt which is proportional to the length thereof.

Accordingly, where there is a movement of articles on long spans, sequences (loops, in the jargon) of conveyors of articles are used, each of a relatively small length and therefore more reliable and more efficient than a single, very long articles conveyor belt.

Transfer modules are then used in order to ensure a connection between two consecutive belt conveyor elements. In fact, the substantially "caterpillar track" configuration of the belts of article conveyors—with substantially semicircular ends—makes it impractical to have a direct transfer of an article being moved between two consecutive belt conveyor elements. Typically, the transfer modules are fixed to a frame structure of the conveyor of articles interposed between the two conveyor belt elements of the conveyors of articles.

The transfer modules include a frame designed to house one or more idle rollers. The frame is fixed to the structure of the frame of the conveyor of articles by means of suitable screws or nut-bolt pairs. The transfer modules are designed so that the rollers provide an ideally continuous sliding surface between two belt conveyor elements in succession, so as to allow a transfer of the articles transported from a belt article conveyor element to another without the risk of damage to the articles or jam for the conveyor of articles.

In more detail, a first belt conveyor element "throws" a transported article onto the transfer module (i.e., the article is pushed onto the transfer module by the sliding movement of the belt). The article then moves by inertia on the idle rollers of the transfer module until a second belt conveyor element (following the first) "picks it up" (i.e., a part of the article slides until it rests on the second belt conveyor element, and is pulled away by the movement of the same). In this way an effective coupling between belt conveyor elements arranged in sequence is achieved.

However, the transfer modules are afflicted by some drawbacks. In particular, in the operation it can happen that the rollers of the transfer module are jammed (i.e., they are no longer able to rotate freely) because of accumulated dirt or leaks of the transported articles (e.g., in the case of beverages or dairy products). This may cause a slowdown or even a shutdown of the transported items. To avoid this, the transfer modules are periodically removed from the sliding structure, and thoroughly washed. Unfortunately, the operation of removal of the transfer modules from the frame structure is time-consuming, and therefore entails a loss of productivity of the plant in which the article conveyor is installed.

Furthermore, in the case of conveyors of articles of large dimensions, it may be necessary to provide several transfer modules arranged side by side to cover the entire width. In these conditions, at each new installation in the working point, it is necessary to carry out an alignment process between the transfer modules arranged side by side to ensure a correct transfer of the transported articles. In addition, the screws or bolts that secure each transfer module to the frame structure are in positions that make the unscrewing operation burdensome, and this operation is also subject to drawbacks, such as the fall of the screws or bolts inside the frame of the conveyor of articles, and when this occurs, additional time is wasted for their recovery, and there are risks of damage to the conveyor of articles.

It would therefore be desirable to provide an improved arrangement of transfer modules, able to solve, at least partially, the above-mentioned disadvantages.

In particular, one or more aspects of a solution according to specific embodiments of the present invention are set forth in the independent claims, with advantageous features thereof being set forth in the dependent claims.

More specifically, an aspect of a solution according to an embodiment of the invention provides an arrangement of transfer modules for a conveyor of articles. The arrangement of transfer modules comprises at least one transfer module, in turn comprising a frame which accommodates a plurality of idle rollers to enable a sliding by inertia of transported articles between consecutive belt/chain conveyors elements of the conveyor of articles. In the solution according to the present invention, the arrangement of transfer modules includes at least one positioning rod. In addition, the frame of the at least one transfer module further comprises a recess shaped to be adapted to allow an insertion by sliding of the at least one transfer module on the at least one positioning rod.

The transfer modules arrangement for an articles conveyor, may include at least one transfer module. Multiple or a plurality of transfer modules may be preferred depending on the width of the articles conveyor.

The transfer module in turn may comprise a frame, housing a plurality of idle rollers for allowing an inertial run of transported articles between consecutive conveyor belt/chain elements of the articles conveyor. The inertial run or momentum may be given to transported articles by a first of consecutive conveyor belt/chain elements, such that transported articles have an inertia/momentum in a conveying direction to bridge the distance over the transfer module to a second of consecutive conveyor belt/chain elements, as the idle rollers may not be driven.

The transfer module may further include at least one positioning rod. The positioning rod may be placed between said first and second consecutive conveyor belt/chain elements, substantially perpendicular to the conveying direction of the consecutive conveyor belt/chain elements.

The positioning rod may serve as mounting bar for mounting at least one transfer module thereon.

The frame of the at least one transfer module may further include a shaped cavity for allowing a sliding insertion of the at least one transfer module on the at least one positioning rod. The shaped cavity may form a sliding fit with the at least one positioning rod, such that transfer modules may be easily slid on the positioning rod and positioned axially along/on the position rod at selected positions. The shaped cavities may be shaped, such that the at least one transfer module may not be lifted in a direction substantially perpendicular to a longitudinal axis of the positioning rod.

The plurality of idle rollers may each be arranged in the frame to freely rotate about a rotation axis, distinct and spaced apart from the positioning rod, in particular distinct from and spaced apart from the longitudinal axis of the positioning rod. The rotation axis may be a geometrical axis, e.g. when the idle rollers are bearing mounted at their ends. The rotation axis may also be a physical axis, e.g. when the idle rollers are rotatably carried on a mounting rod arranged in the frame. By embodying the positioning rod as a separate entity, distinct and spaced apart from the rotation axis about which the idle rollers are mounted in the frame, a transfer module may be provided which can be removed from the positioning rod as a unit, i.e. without having to disassemble the idle rollers from the frame of the transfer module. The invention may thus e.g. be embodied as a transfer modules arrangement, comprising at least one transfer module having a frame in which to which one or more mounting rods are attached, each mounting rod carrying one or more idle rollers so that they can rotate about a rotation axis, and the arrangement further including at least one positioning rod, such that the frame or frames of the transfer module or modules may be slidingly received on the positioning rod, the positioning rod and the mounting rods being distinct and spaced apart. The frame with the rollers and the mounting rod or rods may thus slide along the positioning rod.

The at least one transfer module may further be inserted with friction on the at least one positioning rod. By inserting the at least one transfer module on the positioning rod with friction, the at least one transfer module may be fixed on the positioning rod against axial sliding along the positioning rod. For example, the at least one transfer modules may be mounted to the positioning rod by means of interference fit.

A solution according to one or more embodiments of the invention, as well as further features and advantages thereof, will be better understood with reference to the following detailed description, given purely by way of non-limitative example, to be read in conjunction with the accompanying drawings (in which corresponding elements are indicated with the same or similar numerals and their explanation is not repeated for brevity). In this respect, it is expressly understood that the figures are not necessarily to scale (with some details that can be enhanced and/or simplified) and that, unless otherwise indicated, they are simply used to illustrate conceptually the structures and procedures described. In particular:

Figure 1:
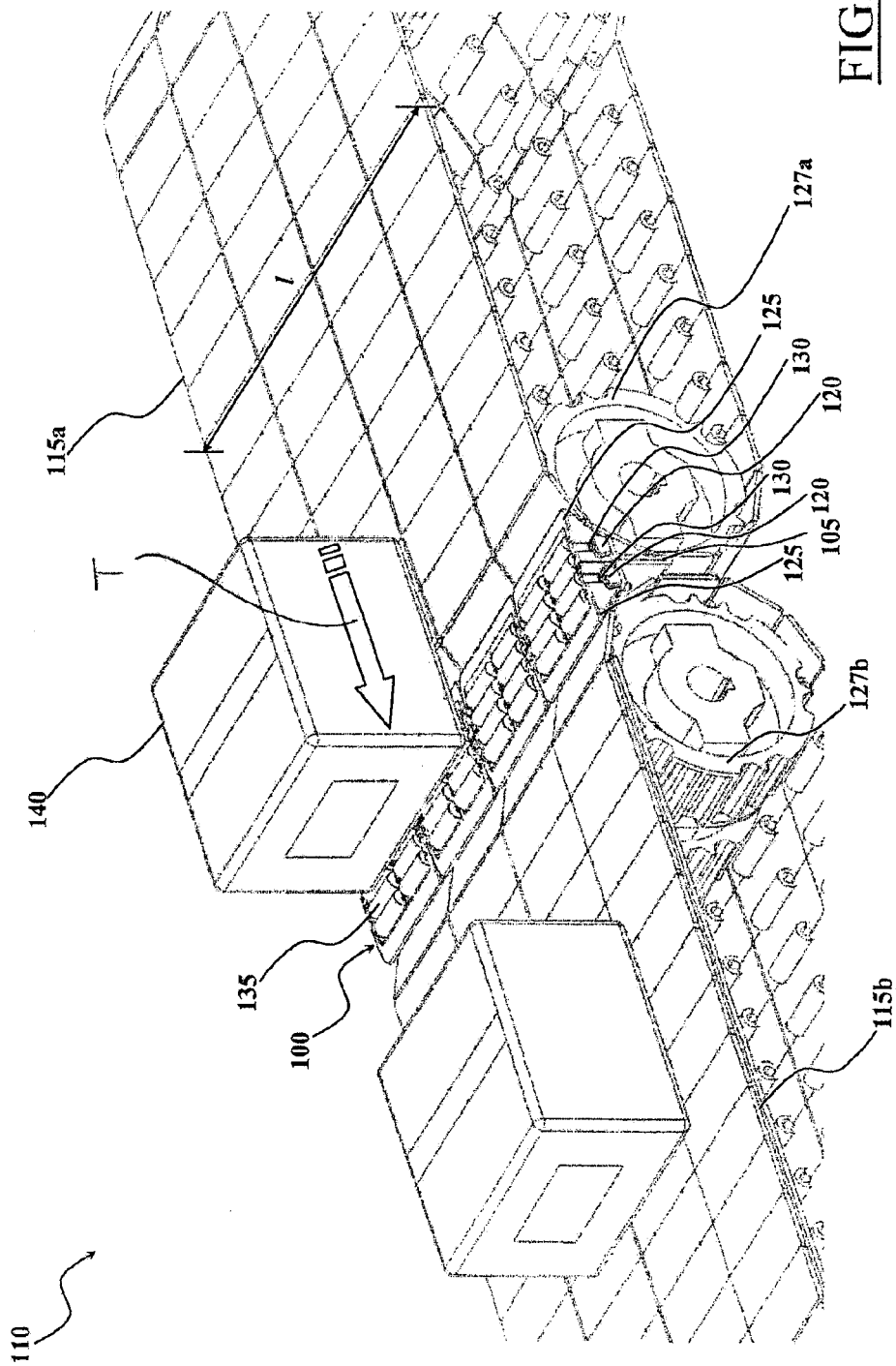
FIG. 1 depicts a simplified isometric view of a portion of a conveyor of articles comprising an arrangement of transfer modules according to an embodiment of the present invention.

With reference to FIGS. 1-3, there is described an arrangement of transfer modules 100 in accordance with an embodiment of the present invention. The arrangement of transfer modules 100 is adapted to be installed on a support structure 105 included in a case (not shown) of the conveyor of articles—the latter being indicated in its entirety by the reference 110. The support structure 105 is formed between a first and a second belt conveyor elements 115a and 115b.

The arrangement of transfer modules 100 comprises two positioning rods 120, on each of which there are inserted a number (four in the example of FIG. 1) of transfer modules 125 arranged side by side so as to substantially match a width/of the belt conveyor elements 115a and 115b. The transfer modules 125 have a shape that preferably, although not exclusively, is substantially a parallelepiped with a flared or tapered side face so as to accommodate a curve present at the end of the belt conveyor elements 115a and 115b—that is, where there is a corresponding pulley 127a and 127b for the movement of the belts of the belt conveyor elements 115a and 115b. Additionally, the transfer modules 125 arranged side by side are locked in position by fixing elements, e.g. screws 130, fixed to the ends of each positioning rod 120 (as will be described in greater detail in the following description).

In addition, the positioning rods 120 are mounted on the support structure 105 in a mutually parallel arrangement and at a distance such that shaped faces 305 of transfer modules 125 inserted on different positioning rods 120 couple to each other.

In this configuration, idle rollers 135 of the transfer modules 125 form a sliding surface interposed between one final extremity of the first belt conveyor element 115a and a leading extremity of the second belt conveyor element 115b. Thus, a transported article 140 "thrown" by the first belt conveyor element 115a slides by inertia on the sliding surface formed by the rollers 135 of the transfer modules 125, until it is "picked up" by the second conveyor belt element 115b. This transfer occurs without the transported article 140 suffering potentially harmful collisions and/or reversals.

Figure 2A:
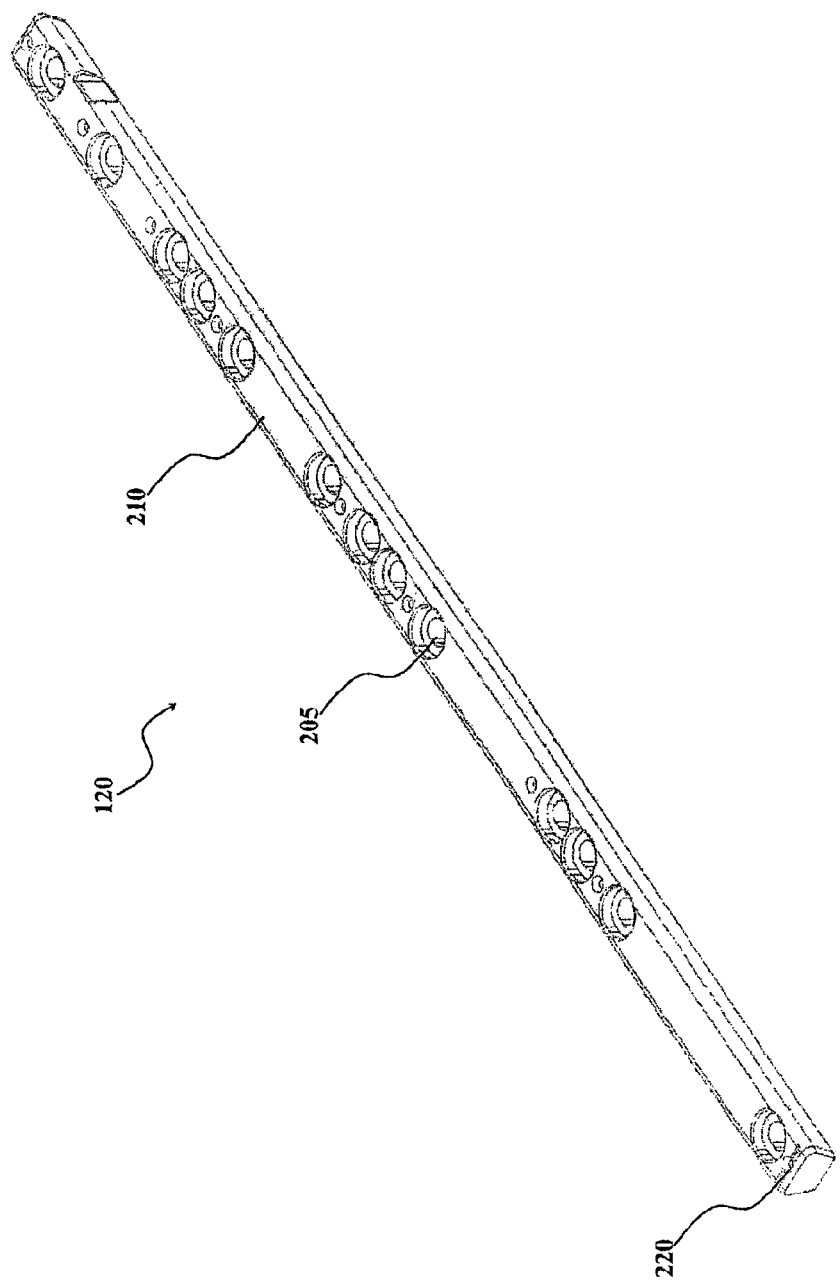
FIG. 2A is an isometric view from above of a positioning rod according to embodiment of the present invention.
Figure 2B:
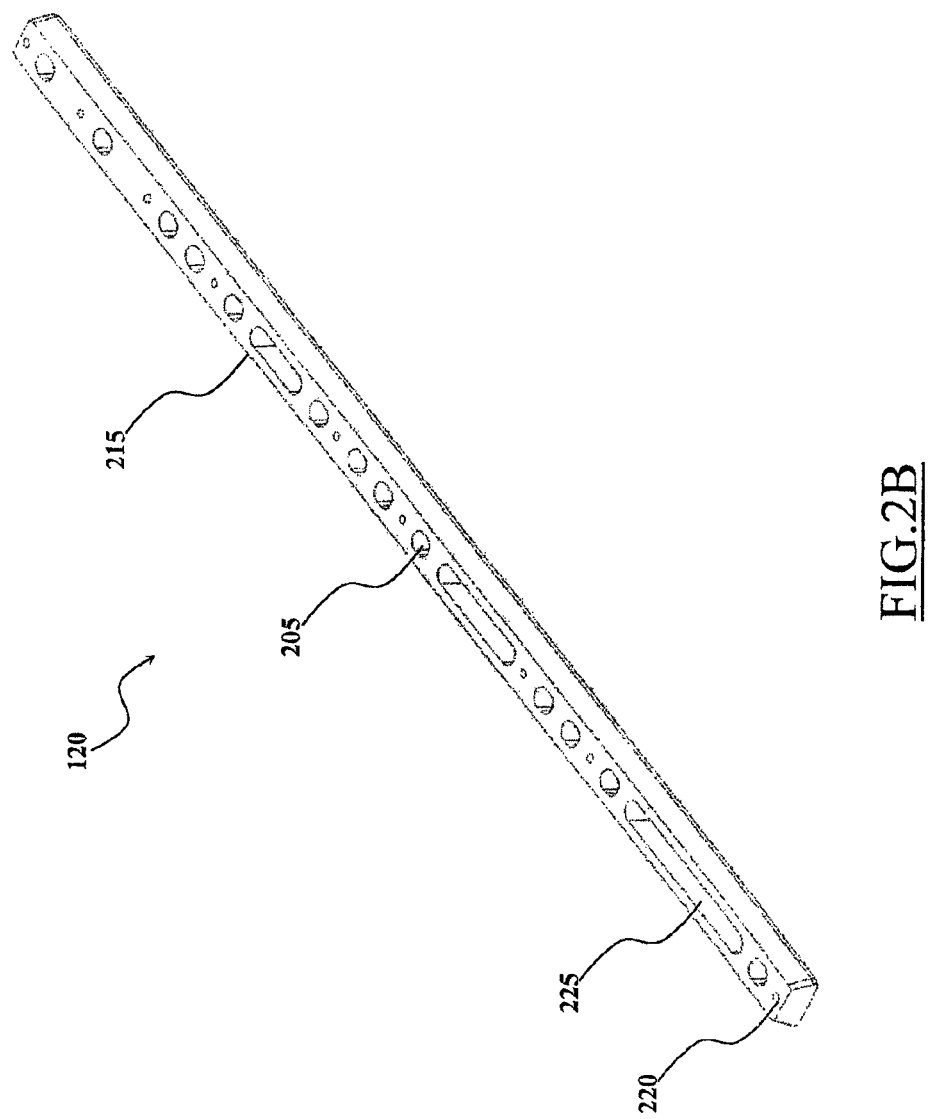
FIG. 2B is an isometric view from below of the positioning rod of FIG. 2A.

In FIGS. 2A and 2B there are shown a top view and a bottom view, respectively, of a positioning rod 120 according to an embodiment of the present invention. The positioning rod 120 is preferably, although not exclusively, formed of a plastic material (such as polyamide), for example by molding. Alternatively, the positioning rod 120 can be formed with other materials (e.g., aluminum or steel) and/or other techniques (for example, extrusion or profiling).

The positioning rod 120 is formed with a substantially trapezoidal cross-section (having a smaller base facing downward when ready for operation). However, it is possible to form the positioning rod with a different cross section, for example in the shape of "T".

A series of fixation through holes 205 is formed in the positioning rod 120. The fixation holes 205 pass through the positioning rod 120 from an upper surface 210 to a lower surface 215 thereof, and are adapted to accommodate each a fastening element (e.g., a screw or a bolt-nut pair) in order to bind the positioning rod 120 to the support structure 105 corresponding to respective through holes (not shown in the figures) formed in the same.

The positioning rod 120 also includes a series of locking through holes 220, also passing through the positioning rod 120 from the upper surface 210 to the lower surface 215 thereof. The locking holes 220 are adapted to accommodate the screws 130 for locking a transversal movement of the transfer modules 125 once they are inserted on the positioning rod 120.

Preferably, although not necessarily, both the fixation holes 205 and the locking holes 220 are formed at different distances along the length of the positioning rod 120, thus providing greater versatility of the positioning rod 120. In more detail, the through holes 205 and 220 are formed at distances such as to allow the use of the same positioning rod with transfer modules 125 of different sizes. Furthermore, it is possible to cut the positioning rod so as to adapt it to the implementation in article conveyors 110 having belt conveyor elements 105a and 105b with a different width l' smaller than the corresponding length l of the positioning rod 120, without the need of producing special positioning rods 120. In fact, the through holes 205 and 220 are formed in the positioning rod 120 at predetermined distances from each other so that on each segment corresponding to the standard width l' of conveyors of articles 115, there are formed two locking holes 220 at its ends, and at least one fixation hole 205 arranged inbetween the latter.

Preferably, although not exclusively, in the bottom surface 215 there are formed relief recesses 225 that extend within the positioning rod 120 for reducing a respective density and weight. Thanks to these recesses 225, a positioning rod 120 more economical and lightweight is obtained.

Figure 3A:
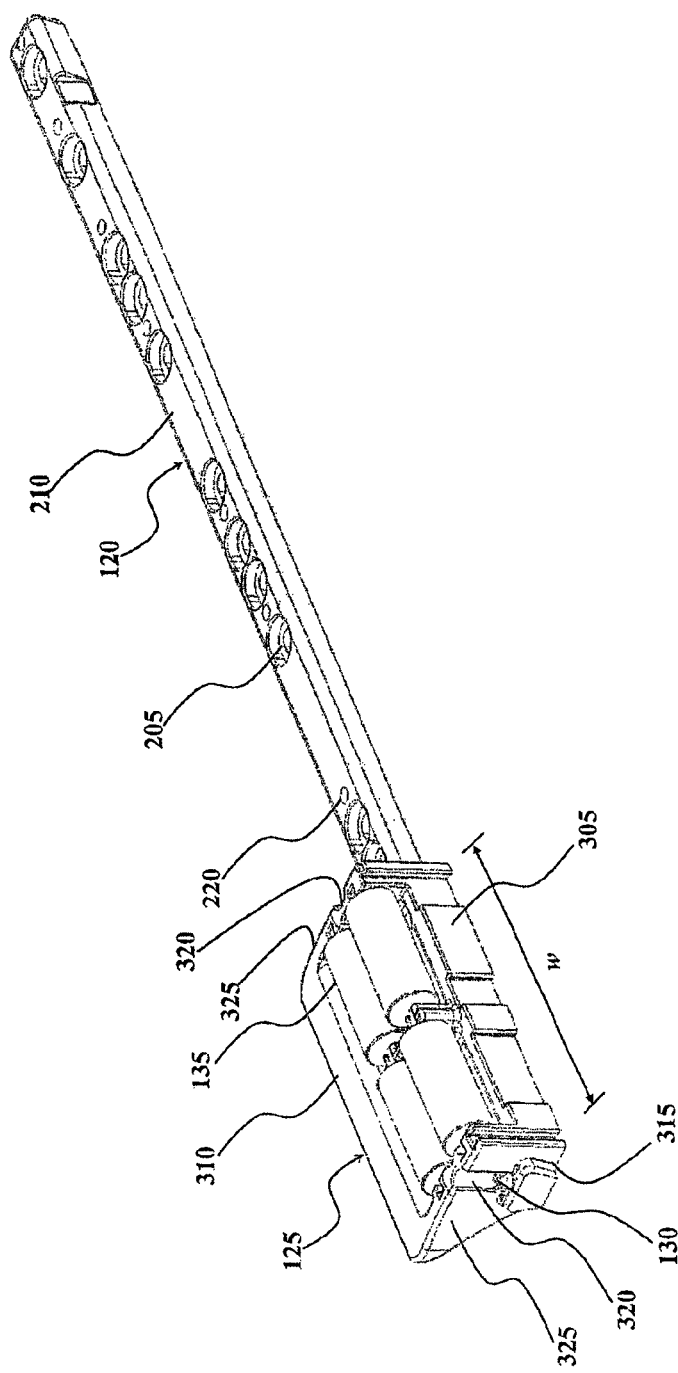
FIG. 3A shows a transfer module inserted in a positioning rod according to an embodiment of the present invention.
Figure 3B:
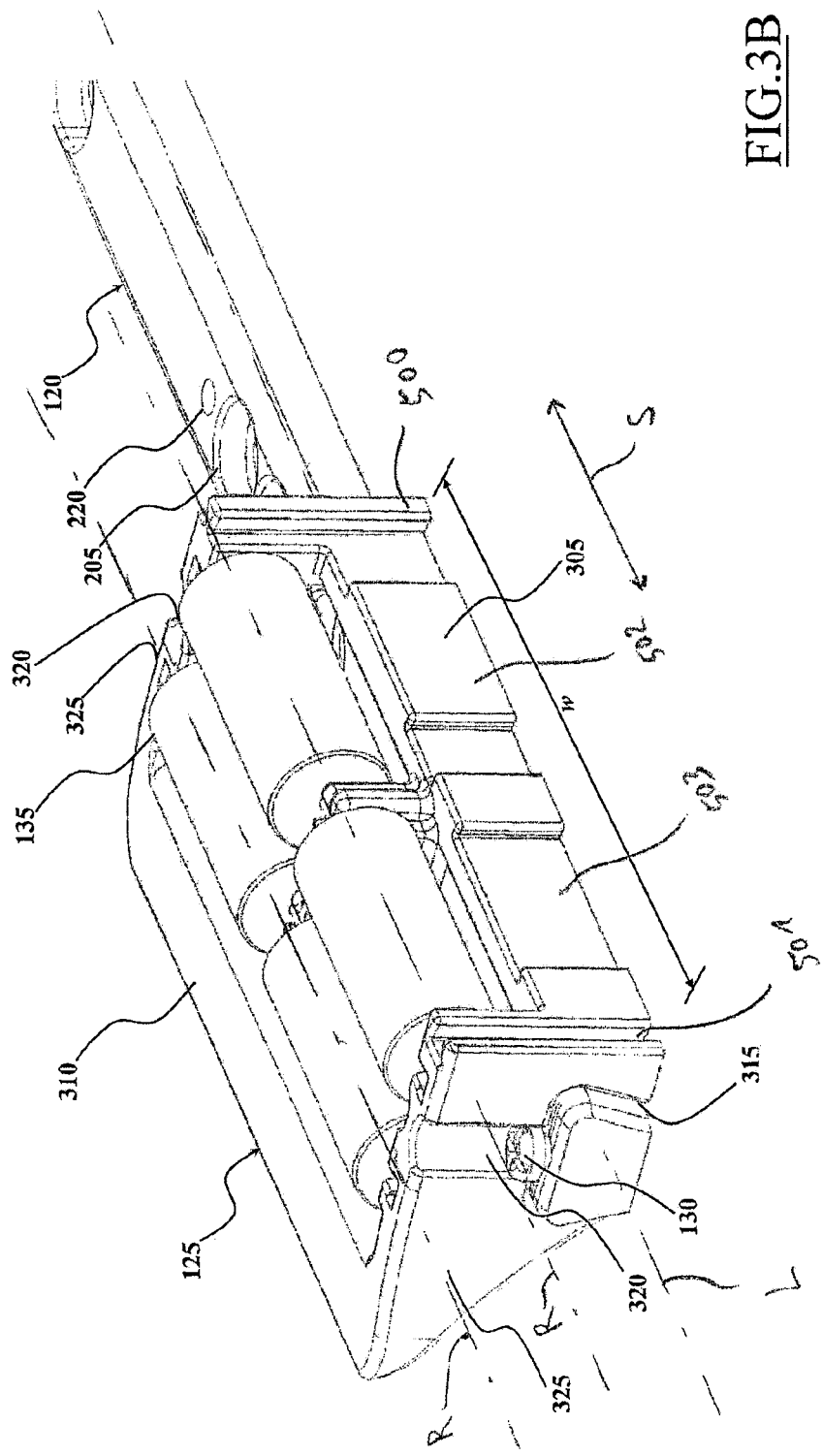
FIG. 3B is an enlarged view of the transfer module in the positioning rod of FIG. 3A.

In FIGS. 3A and 3B there is shown the transfer module 125 inserted in the positioning rod 120. The transfer module 125 comprises a frame 310 mounted to which are one or more idle rollers 135—although in the figures cylindrical rollers 135 are shown, other types of idle rollers can be used, for example spherical rollers; the idle rollers 135 are mounted to the frame 310 to be freely rotatable around rotation axis R, which are supported by the frame 310. The rotation axis is in this case the central axis of a mounting rod (not shown), which is mounted to the frame, and about which the idle rollers can rotate freely. The rotation axis R is thus distinct from, and spaced apart from the positioning rod 120.

In turn, the frame 310 includes a shaped cavity 315 formed from a lower surface (referred to an operating position of the transfer module 125) of the frame 310, with longitudinal axis L lying on a plane parallel but distinct from the plane where the idle rollers rotation axes R in the mounting rods lie. The shaped cavity 315 has a cross section with a shape corresponding to the cross section of the positioning rod 120 (in the case considered in the drawings, a trapezoidal shape), and extending throughout a length w of the frame 310. This allows the shaped cavity 315 to fit slidably on the positioning rod 120. In more detail, the dimensions of the positioning rod 120 are such as to cause a slight deformation of the shaped cavity 315, when the latter is inserted on the positioning rod 120 (e.g., 3-5 tenths of millimeter). This forced (or interfering) insertion and the trapezoidal shape ensures the creation of a bind between the positioning rod 120 and the frame 310 which keeps the latter firmly connected to the former even in case of mechanical stress—to which the arrangement of transfer modules 100 is subjected during operation.

In addition, the above mentioned shaped face 305 of the frame 310 is formed so as to allow an interlock coupling between two transfer modules 125 associated through their respective shaped faces 305 (as shown in FIG. 1).

The frame 310 is preferably, although not exclusively, formed of a plastic material (such as polyamide), for example by molding. Alternatively, the frame 310 may be formed with other materials (e.g., aluminum or steel) and/or other techniques (for example, extrusion or profiling).

To ensure greater stability of the arrangement of transfer modules 100, when the latter is fixed to the support structure 105, the positioning rod 120 is formed so that each portion of length w—that is, corresponding to the length of the transfer modules 125—comprises at least one mounting fixation hole 205. This ensures a greater resistance to mechanical stress and prevents deformation of the positioning rod linked to them (for example, a warping). Preferably, although not exclusively, fixation holes 205 are provided at different distances (as shown in FIGS. 2-3) in order to ensure the presence of at least one fixation hole 205 in each transfer module 125 having any of the standard dimensions used in the industry.

During installation, initially the positioning rods 120 are fixed in position parallel to each other (as previously described) on the support structure 105 via fasteners such as screws and/or pairs nut-bolt (not shown in the figures) inserted in the fixation holes 205. Subsequently, pairs of transfer modules 125 with the respective shaped faces 305 are inserted onto the associated positioning rods 120, thanks to respective shaped cavities 315, to form the sliding surface between the two belt conveyor elements 105a and 105b of the conveyor of articles 110. Once completed the insertion of all the transfer modules 125, the side sliding during the operation is prevented by tightening the screws 130 in the locking holes 220 at the ends of the positioning rod 120. In particular, a lateral groove 320—having a shape preferably, although not exclusively, semicylindrical—provided on each side face 325 of the transfer module 125 facilitates the operation of insertion of the screws 130 (since it ensures a wide working space for a technician).

The arrangement of transfer modules 100 according to an embodiment of the present invention allows a fast removal of the transfer modules 125 for a replacement or a thorough cleaning of the transfer modules 125. In fact, to remove the arrangement of transfer modules 100 it is sufficient to unscrew both the screws 130 at a same end of the positioning rod 120, and then slide the transfer modules 125 therefrom. In doing so, the idle rollers 135 slide with the module frame 310 along the longitudinal axis L of the positioning rod 120. In addition, in the arrangement of transfer modules 100 according to an embodiment of the present invention, it is not necessary to perform an alignment between the transfer modules 125. In fact, the insertion on the positioning rod 120 ensures inherently a proper alignment of the transfer modules 120. The advantages mentioned above are achieved in the arrangement of transfer modules 100 according to one embodiment of the present invention while keeping low the production costs.

It will be understood that within the scope of the present invention there are also arrangements of transfer modules comprising a single positioning rod and transfer modules having alternative forms, for example, having two opposing flared faces.

Also, the transfer modules arrangement 100 for an articles conveyor 110, can include multiple or a plurality of transfer modules 125, depending on the width l of the articles conveyor. The plurality of transfer modules 125 can be placed side by side on the positioning rod 120 as shown in FIG. 5.

The positioning rod 120 can be placed between said first and second consecutive conveyor belt/chain elements 105a and 105b substantially perpendicular to a conveying direction T of the consecutive conveyor belt/chain elements.

The positioning rod 120 can serve as mounting bar 120 for mounting at least one transfer module 120 thereon. The positioning rod 120 can be connected to either of the two conveyor elements 105a and 105b in a conventional manner.

The shaped cavity 315 can be shaped, such that the at least one transfer module 100 placed on the positioning rod 120 with said shaped cavity 315, can not be lifted in a direction substantially perpendicular to a longitudinal axis L of the positioning rod 120.

The shape of the shaped cavity 315 can correspond with a cross sectional shape of the positioning rod 120 to form a form fit with the shape of the shaped cavity 135. In this way the at least one transfer module 100 housing the idle rollers 135 can easily be slid with the shaped cavity 315 onto and moved axially along the longitudinal axis L of the positioning rod 120 in direction S, as shown in FIG. 3b. Preferably, the shaped cavity 315 forms an interference fit with the positioning rod 120, such that the at least one transfer module 100 can be mounted to the positioning rod 120 at desired locations.

The shaped cavity 135 preferably does not coincide with the mounting rods of the idle rollers 135, as this may mean that the idle rollers 135 have to be disassembled when removing the transfer module 100 from the positioning rod 120.

Also, for ease of manufacturing, the positioning rod 120 can be manufactured in a single length. Depending on the width l of the conveyor element 115a, 115b, the positioning rod 120 can be cut to length, to correspond to the width l of the conveyor element 115a, 115b.

The transfer modules arrangement 100 can further be comprised of a plurality of positioning rods 120 placed side by side, substantiality perpendicular to the conveying direction T of a conveyor element 115a, 115b, in between said consecutive conveyor elements 115a, 115b. Each positioning rod 120 can comprise at least one, but preferably a plurality of transfer modules 100. For example, two positioning rods 120 can be placed side by side and both have at least one transfer module 100 slid thereon, as shown in FIG. 1. Two transfer modules 100 placed on the two positioning rods 120 can face each other with shaped faces 305. The shaped faces 305 can be provided with a dove tail 500 and corresponding grove 501 and optionally further form fitting shapes, e.g. 502 and 503 as shown in FIG. 3b. The two transfer modules 100 with facing shaped faces 305 can be connected to each other with the dove tail connections.

Naturally, in order to satisfy contingent and specific requirements, one skilled in the art may introduce to the solution described above many modifications and variations logical and/or physical properties. More specifically, although such a solution has been described with a certain level of detail with reference to one or more embodiments thereof, it is clear that various omissions, substitutions and changes in form and details as well as other embodiments are possible. In particular, various embodiments of the invention may be practiced without the specific details (such as the numerical examples) exposed in the foregoing description to provide a more complete understanding of them, on the contrary, well-known characteristics may be omitted or simplified in order not to obscure the description with details not necessary. Furthermore, it is expressly understood that the specific elements and/or method steps described in relation to each embodiment of the solution exposed may be incorporated in any other embodiment as a normal design choice.

The invention claimed is:

1. A transfer modules arrangement for an articles conveyor, said arrangement comprising:
   at least one transfer module having a frame housing a plurality of idle rollers for allowing an inertial run of transported articles between consecutive conveyor belt/chain elements, said frame including a shaped cavity; and
   at least one positioning rod allowing a sliding insertion of the at least one transfer module on the at least one positioning rod, wherein each idle roller of the plurality of idle rollers is arranged in the frame to freely rotate about a rotation axis R, distinct and spaced apart from the positioning rod.

2. The transfer modules arrangement according to claim 1, wherein the at least one transfer module is inserted with friction on the at least one positioning rod.

3. The transfer modules arrangement according to claim 2, wherein the at least one transfer module is mounted to the positioning rod by an interference fit.

4. The transfer modules arrangement according to claim 1, wherein the at least one positioning rod and the shaped cavity of the at least one transfer module have corresponding cross sections substantially one of trapezoidal shaped and substantially "T" shaped.

5. The transfer modules arrangement according to claim 1, wherein the at least one positioning rod includes fastening through holes adapted to accommodate fastening elements for fastening said at least one positioning rod to a support structure of the articles conveyor.

6. The transfer modules arrangement according to claim 1, wherein the at least one positioning rod includes blocking through holes adapted to accommodate a blocking element for preventing a movement along said at least one positioning rod of the at least one transfer module.

7. The transfer modules arrangement according to claim 6 wherein the at least one positioning rod includes fastening through holes adapted to accommodate fastening elements for fastening said at least one positioning rod to a support structure of the articles conveyor, and the blocking through holes and the fastening through holes are formed on the at least one positioning rod so that said at least one positioning rod may be divided into segments of lower length l', each segment having:
   at least one fastening through hole located below the at least one transfer module, when said at least one transfer module is inserted in said segment of at least one positioning rod, and a blocking through hole at each end.

8. The transfer modules arrangement according to claim 6, wherein the frame of the at least one transfer module further includes a groove on its lateral sides adapted to facilitate insertion of the blocking element when the at least one transfer module is inserted on the at least one positioning rod.

9. The transfer modules arrangement according to claim 1, wherein the frame of the at least one transfer module includes a shaped side associable with a corresponding shaped side of a further transfer module.

10. The transfer modules arrangement according to claim 1, wherein the at least one positioning rod further includes a plurality of cavities extending inward said at least one positioning rod from a lower side for reducing a density of the same.

11. The transfer modules arrangement according to claim 1, wherein the at least one positioning rod and the at least one transfer module are formed of a plastic material.

* * * * *